March 4, 1941.                D. A. LAMB                2,233,617
                     RESISTANCE WELDING APPARATUS
                        Filed June 1, 1937              2 Sheets-Sheet 1
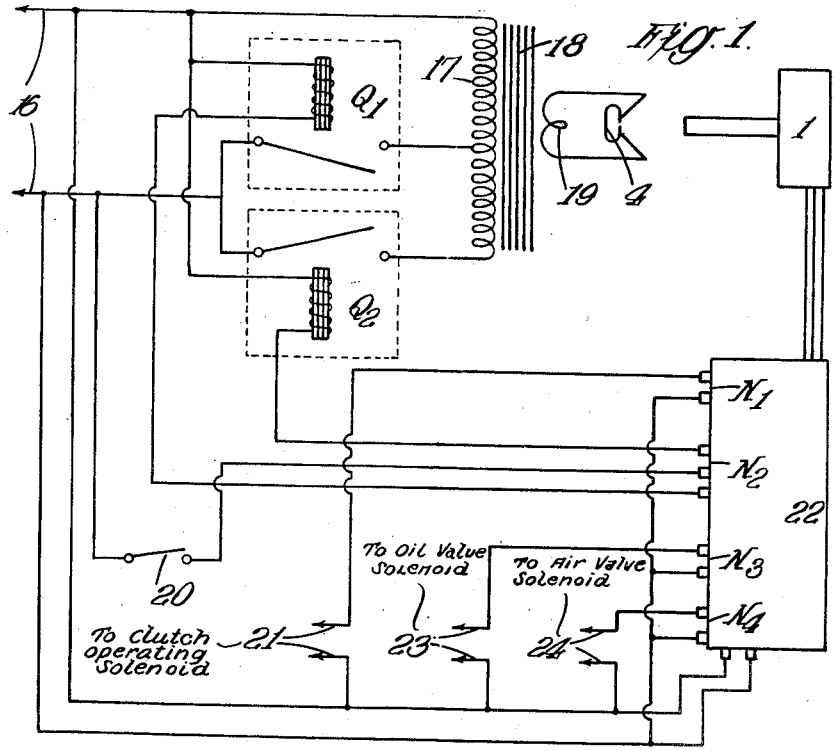
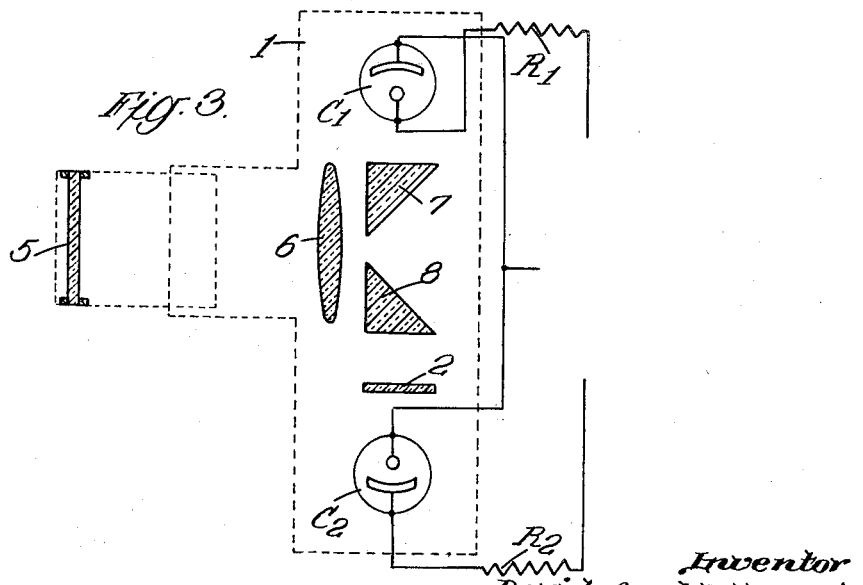
Inventor
David Amphlett Lamb
Frederick S. Duncan
John H. Hilliard Attys

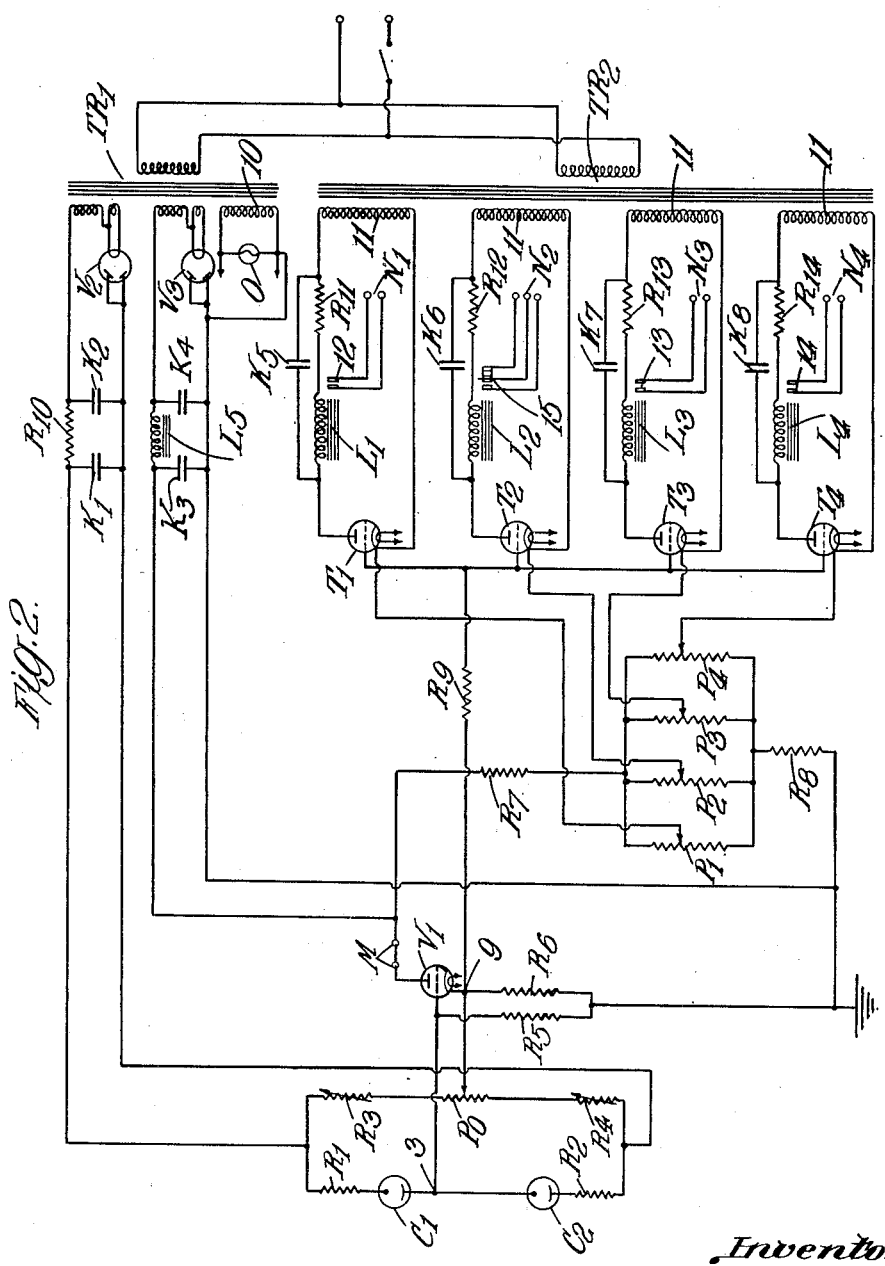

Patented Mar. 4, 1941

2,233,617

UNITED STATES PATENT OFFICE 2,233,617

RESISTANCE WELDING APPARATUS

David Amphlett Lamb, Westminster, London, England, assignor to American Chain & Cable Company Inc., New York, N. Y., a corporation of New York Application June 1, 1937, Serial No. 145,769
In Great Britain June 2, 1936

7 Claims. (Cl. 219—4)

This invention relates to resistance welding apparatus, the chief object being to evolve a method and apparatus whereby the operation of such machines may be rendered more consistent when working automatically than has hitherto been the case. A further object of the invention is to evolve a method of maintaining the swaging dies of resistance welding apparatus relatively cool in the interval between their operation, that is to say when they are remote from the link or other work which is to be welded.

Although the invention is applicable to resistance welding generally the invention is of particular importance in connection with the electric welding of chain links. It is at present the usual practice to employ either of two methods for controlling the time over which the joint in each link is subjected to the heating action of the electric current. According to one method, an operator watches each joint during the process of welding, the operator switching off the electric current immediately the joint has reached a temperature which in his opinion is sufficient to ensure a satisfactory weld. With this method the strength and efficiency of the weld depends upon the experience of the workman in judging the correct temperature visually. The other method at present employed is automatic, the switching off of the current being controlled either by means of a cam which can be set to break the electrical circuit after a predetermined interval of time, or by means of a radiation pyrometer sensitive to heat radiations emanating from the weld and serving to actuate the main welding current controlling switch through the medium of a system of relays.

According to the present invention we employ a photoelectric or selenium cell disposed adjacent the welding machine and which is responsive to the intensity of the heat or light rays given off by the joint during the process of welding, the cell through the medium of a suitable amplifier or relay being adapted to actuate a switch or other member to break the electric circuit or otherwise discontinue the welding process upon operation of the cell as a result of the heat or light rays emanating from the joint reaching a certain magnitude. It is preferred to employ a cell of the photo-electric type and it is preferred to employ at least two cells operating in conjunction, one cell being most sensitive to visible radiations and another cell most sensitive to radiations of the infra-red category, the latter characteristic being emphasised by placing in front of the cell an infra-red filter.

In order that the said invention may be clearly understood and readily carried into effect the same will now be more fully described with reference to the accompanying drawings, in which:

Figure 1 is a general arrangement wiring diagram of the complete installation.

Figure 2 is a wiring diagram of the welder control unit.

Figure 3 is a diagrammatic view of the photoelectric cell unit alone.

The photo-electric cell unit is designated generally by the reference numeral 1 (see Figures 1 and 3) and contains two photo-electric cells $C^1$ and $C^2$, the cell $C^1$ being most sensitive to visible radiations and the cell $C^2$ being most sensitive to radiations of the infra-red category, this characteristic being emphasized by placing in front of the cell $C^2$ an infra-red filter 2. Each cell has in series with it a high resistance $R^1$ and $R^2$ to limit the ionisation current in the event of a gas filled cell being used, although it is preferred to employ cells of the vacuum type. The cells $C^1$ and $C^2$ have a uni-directional voltage applied across them by means of windings on the transformer $TR^1$, the rectifying valve $V^2$, smoothing resistance $R^{10}$ and condensers $K^1$ and $K^2$, the positive lead being connected to resistance $R^1$ and the negative lead to resistance $R^2$. In parallel with the cells $C^1$ and $C^2$ and the resistances $R^1$ and $R^2$ are the resistances $R^3$ and $R^4$ and the potentiometer PO, the resistances $R^3$ and $R^4$ being variable. The junction point 3 of the cells is connected to the grid of the valve $V^1$, the cathode of the valve being connected to the tapping point of the potentiometer PO. Consequently the grid potential of the valve $V^1$ will depend on the relative values of the equivalent resistances of the cells $C^1$ and $C^2$, whilst the cathode potential will depend on the setting of the potentiometer PO. As the temperature of the weld increases, the total radiation from the hot metal increases until the equivalent resistance of each cell decreases. Also as the temperature rises the proportion of visible light increases. The equivalent resistance of the cell $C^2$ (with its infra-red filter) does not tend to decrease due to this cause, and in fact if this were the only change occurring (i. e. if the total radiation was not increased but only the proportion of visible radiation), the equivalent resistance of this cell would increase. The cell $C^1$, however, is highly sensitive to visible radiations and so its equivalent resistance decreases due to the increased proportion of visible energy. Thus the equivalent resistance of cell $C^1$ decreases both due to the increase of the total radiation and to the increasing proportion of visible radiations. The equivalent resistance of cell $C^2$, however, decreases only due to the increase of total radiation, the increasing proportion of visible radiation tending to have the reverse effect, and so the sum effect is that the equivalent resistance of the cell $C^1$ decreases much more rapidly than that of the cell $C^2$. Consequently, the potential at their junction point 3 (and therefore of the grid of the valve $V^1$ also) becomes less and less negative as the temperature of the metal to be welded increases.

The potentiometer PO is adjusted so that initially the cathode of the valve is made more positive than the grid, that is to say the grid is given a negative bias. As explained above, as the temperature of the weld increases, the potential of the grid becomes less and less negative. The potential of the cathode once the potentiometer PO is set, remains steady, however, and so the negative grid bias of the valve $V^1$ steadily decreases as the temperature increases. Consequently, the cathode to anode D. C. resistance of the valve also steadily decreases as the temperature of the metal to be welded increases.

The link being welded is designated by the reference numeral 4 and is shown in Figure 1, the visible and invisible radiations emanating from the weld passing through lenses 5 and 6 and prisms 7 and 8 on to the cells $C^1$ and $C^2$ (see Figure 3).

The grids of the thyratron valves $T^1$, $T^2$, $T^3$, and $T^4$ are all connected to the junction point 9 of the resistance $R^6$ and the cathode of the valve $V^1$. The uni-directional voltage is applied across the valve $V^1$ and resistance $R^6$ by means of the windings on the transformer $TR^1$, the rectifying valve $V^3$, the smoothing choke $L^5$ and the condensers $K^3$ and $K^4$, the positive connection going to the anode of the valve and the negative to the end of the resistance $R^6$ remote from the valve. Consequently, the potential of the grids of the thyratrons (which are all the same) depends on the relative values of the resistance $R^6$ and the D. C. resistance of the valve. This latter decreases as the temperature at the weld increases, while the resistance $R^6$ remains fixed. Therefore, as the temperature of the weld increases, the grid potential of the thyratrons becomes more and more positive (that is to say less and less negative). In the case of the thyratron $T^4$, its cathode is connected to the slider of the potentiometer $P^4$. This is in series with the resistances $R^7$ and $R^8$ and together resistances $R^7$, potentiometer $P^4$ and resistance $R^8$ are in parallel with the valve $V^1$ and resistance $R^6$ and in this way resistance $R^7$, potentiometer $P^4$, and resistance $R^8$ have a D. C. voltage across them. The cathode potential therefore depends on the setting of the potentiometer $P^4$. This is set so that initially the cathode of the thyratron is more positive than its grid, that is to say it has a negative grid bias and as the temperature of the weld increases the grid if the thyratron becomes less and less negative, that is to say the negative grid bias steadily decreases.

At a certain critical bias the thyratron will suddenly pass current and actuate the relay $L^4$, which in turn will close a valve in the compressed air line through which a blast of compressed air has previously been directed on to the swaging dies for the purpose of cooling them preparatory to the link being heated to its correct welding temperature. In this way a supply of compressed air to the swaging dies is cut off automatically in accordance with the temperature of the link. It will be readily understood that for any given setting of the potentiometer PO the temperature of the weld at which the thyratron $T^4$ operates depends on the value of its initial grid bias, that is to say it depends on the setting of the potentiometer $P^4$. Similarly, and again with any given setting of the potentiometer PO, the temperatures at the weld at which the thyratrons $T^3$, $T^2$ and $T^1$ operate, depend on the settings of the potentiometers $P^3$, $P^2$ and $P^1$ respectively, the thyratrons $T^3$, $T^2$ and $T^1$ serving to actuate switches controlling the welding mechanism, the welding voltage, and the cutting-off of the welding current, respectively. The thyratron $T^3$ operates an oil valve which prevents oil leaving the cylinders and in this manner a piston-cylinder combination is made solid and in this condition any final high point on the cams will be effective in providing a further amount of upset to the link. Alternatively $T^3$ can operate a valve which changes the oil pressure in the cylinders. The thyratron $T^2$ operates a relay which reduces the secondary voltage of the welding transformer. The thyratron $T^1$ is the temperature control. It cycles the machine to effect the final upset and interrupt the welding current. The several thyratrons operate under control of the shift of energy distribution as the joint is brought up to welding temperature. The visible light radiation increases more rapidly than the total radiation so that the resistance of cell $C^1$ decreases much more rapidly than that of cell $C^2$ which is most sensitive to infra-red radiations and least sensitive to visible light radiations. With any given settings of the potentiometers $P^1$, $P^2$, $P^3$ and $P^4$ the temperatures at which the thyratrons operate can all be increased or decreased simultaneously by altering the setting of the potentiometer PO, this by altering the cathode potential of the valve $V^1$, alters its initial grid bias and therefore its initial cathode to anode resistance. This in turn alters the initial grid potential of all the thyratrons.

The resistances $R^3$ and $R^4$ are variable so that all cells however much their characteristics vary, can be balanced up in the circuit satisfactorily. The resistance $R^5$ which is of a relatively high value connects the grid of the valve $V^1$ to earth in order to provide a leakage path in the event of grid current flowing, whilst there is also a resistance $R^9$ in the lead to the grids of the thyratrons. It should be noted that PO is the potentiometer used to control the temperature, as if the potentiometer $P^1$ were used for this purpose every alteration to the adjustment of $P^1$ would necessitate adjustments to $P^2$, $P^3$, $P^4$, while adjusting the potentiometer PO alters the operating temperatures of all the thyratrons simultaneously. The use of the potentiometer $P^1$ is to adjust the point on the grid voltage/anode current characteristic of the valve $V^1$ at which the thyratron $T^1$ operates. To facilitate this adjustment, terminals M are provided in the anode lead of the valve $V^1$ to which a milliammeter may be connected. The heaters of the valve and thyratrons are fed from a winding 10 on the transformer $TR^1$ across which is connected a pilot light O to show when the power is switched on to the apparatus. Separate windings 11 on the transformer $TR^2$ apply alternating voltages across the anode and cathode of each of the thyratrons $T^1$, $T^2$, $T^3$ and $T^4$ which are thus reset automatically fifty times a second or depending on the supply frequency. In the anode circuits of the thyratrons are connected the operating coils of the relays $L^1$, $L^2$, $L^3$ and $L^4$ and the current limiting resistances $R^{11}$, $R^{12}$, $R^{13}$ and $R^{14}$. The coils of the relays $L^1$, $L^2$, $L^3$ and $L^4$ and resistances $R^{11}$, $R^{12}$, $R^{13}$ and $R^{14}$ are shunted by condensers $K^5$, $K^6$, $K^7$ and $K^8$. The relays $L^1$, $L^3$ and $L^4$ each have two contacts 12, 13 and 14 respectively connected to the terminals $N^1$, $N^3$ and $N^4$ respectively which are normally held apart by means of a spring. When the coils are energized these contacts close and energize external solenoids which are arranged to cycle the machine, operate an oil valve, and close the compressed air valve respectively. The relay $L^2$ has three contacts 15 connected to the terminals $N^2$. The centre and one of the other contacts (which will be referred to as the second) are normally closed by a spring. When the coil is energized, the centre contact is pulled away from the second contact and moves over against the third contact. The second and third contacts are each connected to one end of the solenoid of a main contactor $Q^1$ and $Q^2$ (see Figure 1). The other ends of these two solenoids are connected to one of the supply mains 16 (see Figure 1). The centre contact is connected to the other main through a cam switch on the machine. The contactor $Q^1$ is connected to a tapping on the primary 17 of the welding transformer 18 giving a comparatively high secondary voltage whilst contactor $Q^2$ is connected to the tapping giving a lower voltage. When the cam switch closes, the solenoid on $Q^1$ becomes energized thus closing its contacts and resulting in a comparatively high voltage across the transformer secondary winding 19, which is connected with the electrodes which are in electrical connection with the link 4. When a suitable temperature at the weld is reached the thyratron $T^2$ energizes the coil of the relay $L^2$ opening the centre and second contacts and closing the centre and third contacts. This results in the contactor $Q^1$ being opened and the contactor $Q^2$ being closed. In this manner a lower voltage is produced across the secondary winding 19 of the transformer 18, and applied to the link during the latter part of the welding process. When the required welding temperature is reached the photo-electric cells will cycle the machine, the movement of the cam shaft thus obtaining being arranged to open the cam switch immediately, thus discontinuing the flow of current through the link and avoiding any further rise in temperature. Alternatively, the photoelectric cells can be arranged to open a contactor in the primary circuit of the transformer and at the same time cycle the machine.

In Figure 1 the cam switch is designated by the reference numeral 20, leads 21, from terminals on the box 22 containing relays N1, N2, N3 and N4, leading to the clutch operating solenoid. Leads 23 and 24 are adapted for connection respectively with solenoids serving to operate an oil valve and an air valve.

What I claim and desire to secure by Letters Patent of the United States is:

1. The method of controlling a welding function of an electric welding machine in welding a joint which comprises passing a welding current through the joint to be welded to heat the joint to a predetermined temperature, and using radiant energy from the heated joint in predetermined relation of visible radiation to radiation of the infra-red category to control the function of the machine.

2. The method of operating an electric welding machine in welding a joint which comprises passing a welding current through the joint to be welded to heat the joint to a predetermined temperature, and using radiant energy from the heated joint in a predetermined relation of visible radiation to radiation of the infra-red category emanating from the joint to interrupt said welding current when the said predetermined temperature has been reached.

3. The method of welding as defined in claim 1 characterized by controlling welding pressure in accordance with the relation of visible radiation to radiation of the infra-red category.

4. The method of controlling welding defined in claim 1 characterized by terminating cooling of welding dies under control of radiant energy emanating from the joint.

5. In an electric welding apparatus, means for passing a welding current through a joint to be welded, means responsive to radiant energy emanating from the joint during a welding operation for controlling a function of the apparatus, said last mentioned means including a cell most sensitive to visible radiations and a cell most sensitive to radiations of the infra-red character, and electrical function control circuits associated with said cells, said cells operating conjointly to influence said control circuits in accordance with a predetermined relation of visible light to total radiation emanating from a joint being welded.

6. In an electric welding apparatus, means for passing electric welding current through a joint to be welded, means for interrupting the welding current in accordance with a predetermined condition at the weld, and separate photoelectric means adjacent the welding region operably associated to conjointly effect control of said current interrupting means, one of said photoelectric means being most sensitive to visible radiations and the other to radiations of the infra-red category whereby interruption of the welding current is effected in accordance with the relation of visible radiation to total radiation emanating from the welding region.

7. In a control device for electric welding apparatus the combination of means for passing welding current through a joint to be welded, two photoelectric cells responsive to radiant energy emanating from the welding region, one of said cells being most sensitive to visible radiations and the other to radiations of the infra-red category, an electrical circuit associated with said cells and including control devices for controlling the welding apparatus, said circuit being controlled conjointly by said cells.

DAVID AMPHLETT LAMB.